United States Patent Office 2,306,357

OPAQUING AGENT FOR VITREOUS ENAMELS

Carl J. Harbert, Shaker Heights, and Clarence A. Seabright, Cleveland, Ohio, assignors to The Harshaw Chemical Company, Elyria, Ohio, a corporation of Ohio No Drawing. Application September 26, 1940, Serial No. 358,556

11 Claims. (Cl. 106—312)

This invention relates to opaquing agents for vitreous enamels and particularly to novel compositions of superior opaquing properties.

In U. S. Patent No. 2,199,794 to Harshaw and Stillwell there is described a class of opaquing agents containing oxides of calcium, antimony and titanium together with calcium fluoride or other fluoride and containing these elements or constituents in preferred proportion approximately corresponding to the empirical formula, $$2CaO \cdot Sb_2O_5 \cdot 3TiO_2$$

and with from 5% to 30% of $CaF_2$ or other fluoride. These compositions are excellent opaquing agents and have been widely used.

We have now discovered that we are able to produce compositions of somewhat different proportions but similar to those of the Harshaw and Stillwell patent and which are capable of imparting to vitreous enamels under conditions of commercial use a substantially greater opacity accompanied by a very much improved fusibility. Opaquing value is determined by the total reflectance of the resulting enamel and the shape of the color curve, magnesium oxide being taken as a standard and the reflectance being expressed in terms of per cent of the reflectance of the standard. Measured in this way we find that our novel compositions, at optimum proportions, are definitely superior to tin oxide as opaquing agents. Fusibility may be measured likewise by comparison with a standard, suitably tin oxide. Equal amounts of the standard and the opacifier to be tested are made into a slip using the same amounts of the same frit and other ingredients necessary. The slip is dried, and the flowability of the two dried slips is tested at a temperature which will cause at least one of them to flow appreciably. Tested in this way, we find that our novel compositions, at optimum proportions, exhibit fusibility approximately that of tin oxide and definitely superior to that of the compositions of the Harshaw and Stillwell patent referred to.

We consider the optimum composition to be:

| | Per cent |
|---|---|
| CaO | 24.6 |
| $Sb_2O_5$ | 40.5 |
| $TiO_2$ | 30.0 |
| $CaF_2$ | 4.9 |

This corresponds to an empirical formula:

$$3\tfrac{1}{2}CaO \cdot \tfrac{1}{2}CaF_2 \cdot Sb_2O_5 \cdot 3TiO_2$$

Considerable latitude is possible without loss of the superior character of the product but the following proportion limits should be observed:

(1) The mol ratio between $Sb_2O_5$ and $TiO_2$ should be between 1:1 and 1:4½.

(2) The mol ratio of $Sb_2O_5$ to $CaF_2$ should be kept between 1:1 and 1:¼, although a valuable product can be made without any fluoride.

(3) The mol ratio of $Sb_2O_5$ to CaO should be kept between 1:3 and 1:4½. In the event no $CaF_2$ is used, the mol ratio of $Sb_2O_5$ to CaO may be 1:3 to 1:4½, but preferably is from 1:3¾ to 1:4¼ and most desirably is approximately 1:4. We do not wish to be understood as representing that we have produced compositions not containing any fluoride which are equal to the best compositions produced according to the Harshaw and Stillwell patent in respect to reflectance. We have not. Such compositions do, however, exhibit superior fusibility and are capable at the optimum proportion of producing reflectance approaching closely to that produced by tin oxide.

The above indicated limits approximate the following suitable proportion limits:

| | Molecular weights |
|---|---|
| $Sb_2O_5$ | 1 |
| $TiO_2$ | 1 to 4½ |
| CaO | 3 to 4½ |
| $CaF_2$ | ¼ to 1 |

As indicated, it is possible to omit $CaF_2$ altogether and still obtain a valuable product.

We prefer to produce compositions of even closer proportion limits, as follows:

| | Molecular weights |
|---|---|
| $Sb_2O_5$ | 1 |
| $TiO_2$ | 1.3 to 3.0 |
| CaO | 3.5 to 4.0 |
| $CaF_2$ | 0.4 to 0.6 |

In the event no fluoride is used, we prefer to produce compositions within the following proportion limits:

| | Molecular weights |
|---|---|
| $Sb_2O_5$ | 1 |
| $TiO_2$ | 1 to 4½ |
| CaO | 3¾ to 4¼ |

These compositions may be produced by calcining under oxidizing conditions, $Sb_2O_3$, $TiO_2$, $CaF_2$ and a suitable source of CaO, such as CaO, $Ca(OH)_2$, $CaCO_3$, $Ca(NO_3)_2$ or mixtures thereof.

Calcination preferably is carried out at a temperature from 1000° C. to 1200° C., batch temperature, in an oxidizing atmosphere. The time required varies according to the temperature and other conditions, particularly the size of the batch, larger batches requiring longer time. The reflectance is nearly fully developed by 1½ hours firing at 1150° C., whereas three or more hours are desirable at 1000° C. While other conditions may be used successfully, we prefer to fire for three hours or longer at from 1000° C. to 1150° C. or two hours or longer at 1100° C. to 1200° C.

In the preferred practice of the invention we make use of batch compositions within the following proportion limits:

|  | Molecular weights |
|---|---|
| $Sb_2O_3$ | 1 |
| $TiO_2$ | 1 to 4½ |
| $CaCO_3$ 50% to 90%<br>$Ca(OH)_2$ 50% to 10% } Between | 3 and 4½ |
| $CaF_2$ | ¼ to 1 |

Most desirably we operate within the following limits:

|  | Molecular weights |
|---|---|
| $Sb_2O_3$ | 1 |
| $TiO_2$ | 1.3 to 3.0 |
| $CaCO_3$ 70% to 80%<br>$Ca(OH)_2$ 30% to 20% } | 3½ to 4 |
| $CaF_2$ | 0.4 to 0.6 |

The following examples will serve to illustrate the invention:

Example I

A batch was prepared by admixing thoroughly in dry powder form the following:

|  | Parts by weight |
|---|---|
| $Sb_2O_3$ | 583 |
| $TiO_2$ | 480 |
| $CaCO_3$ | 600 |
| $Ca(OH)_2$ | 74 |
| $CaF_2$ | 78 |

This batch was calcined at 1150° C. for 2 hours in an oxidizing atmosphere.

Example II

The foregoing example may be varied by employing any of the following batch compositions:

(a)

|  | Parts by weight |
|---|---|
| $Sb_2O_3$ | 583 |
| $TiO_2$ | 480 |
| $CaCO_3$ | 400 |
| $Ca(NO_3)_2$ | 492 |
| $CaF_2$ | 78 |

(b)

|  | Parts by weight |
|---|---|
| $Sb_2O_3$ | 583 |
| $TiO_2$ | 480 |
| $CaCO_3$ | 700 |
| $CaF_2$ | 78 |

(c)

|  | Molecular weight |
|---|---|
| $Sb_2O_3$ | 583 |
| $TiO_2$ | 480 |
| $CaCO_3$ | 800 |

The above described compositions are suitable for mill additions and are preferably used at 2% to 10% and usually at about 4% to 6%.

We do not know the final state of combination of the oxides in the calcination products and accordingly refer to such products as containing the constituent oxides and fluoride.

Having thus described our invention, what we claim is:

1. A new composition of matter suitable for use as an opaquing agent, the same being the product of calcining under oxidizing conditions materials capable of yielding:

|  | Molecular weights |
|---|---|
| $Sb_2O_5$ | 1 |
| $TiO_2$ | 1 to 4½ |
| CaO, between | 3 and 4½ |

2. A new composition of matter suitable for use as an opaquing agent, the same being the product of calcining under oxidizing conditions materials capable of yielding:

|  | Molecular weights |
|---|---|
| $Sb_2O_5$ | 1 |
| $TiO_2$ | 1.3 to 3.0 |
| CaO, between | 3 and 4½ |
| $CaF_2$ | ¼ to 1 |

3. A new composition of matter suitable for use as an opaquing agent, the same being the product of calcining under oxidizing conditions materials capable of yielding:

|  | Molecular weights |
|---|---|
| $Sb_2O_5$ | 1 |
| $TiO_2$ | 1.3 to 3.0 |
| CaO | 3.5 to 4 |
| $CaF_2$ | 0.4 to 0.6 |

4. A new composition of matter suitable for use as an opaquing agent, the same being the product of calcining under oxidizing conditions materials capable of yielding:

|  | Molecular weights |
|---|---|
| $Sb_2O_5$ | 1 |
| $TiO_2$ | 1 to 4½ |
| CaO | 3¾ to 4¼ |

5. A new composition of matter suitable for use as an opaquing agent, the same being the product of calcining under oxidizing conditions materials capable of yielding approximately:

|  | Molecular weights |
|---|---|
| $Sb_2O_5$ | 1 |
| $TiO_2$ | 3 |
| CaO | 3½ |
| $CaF_2$ | ½ |

6. A new composition of matter suitable for use as an opaquing agent, the same being the product of calcining under oxidizing conditions materials capable of yielding approximately:

|  | Molecular weights |
|---|---|
| $Sb_2O_5$ | 1 |
| $TiO_2$ | 3 |
| CaO | 4 |

7. A process of making an opaquing agent for vitreous enamels comprising calcining under oxidizing conditions and at temperatures from 1000° C. to 1200° C., $Sb_2O_3$, $TiO_2$, $CaF_2$, and a source of CaO from the group consisting of CaO, $Ca(OH)_2$, $CaCO_3$, $Ca(NO_3)_2$ and mixtures thereof, the proportions being such as to produce a composition containing in the indicated proportions the following:

|  | Molecular weights |
|---|---|
| $Sb_2O_5$ | 1 |
| $TiO_2$ | 1 to 4½ |
| CaO, between | 3 and 4½ |

8. A process of preparing an opaquing agent for vitreous enamels comprising calcining in an oxidizing atmosphere a batch of the following composition and proportions:

| | Molecular weights |
|---|---|
| $Sb_2O_3$ | 1 |
| $TiO_2$ | 1 to 4½ |
| $CaCO_3$ 50% to 90%<br>$Ca(OH)_2$ 50% to 10% | To yield CaO, more than 3 and less than 4½ |
| $CaF_2$ | ¼ to 1 |

9. A process of preparing an opaquing agent for vitreous enamels comprising calcining in an oxidizing atmosphere a bath of the following composition and proportions:

| | Molecular weights |
|---|---|
| $Sb_2O_3$ | 1 |
| $TiO_2$ | 1.3 to 3.0 |
| $CaCO_3$ 70% to 80%<br>$Ca(OH)_2$ 30% to 20% | To yield CaO, 3½ to 4 |
| $CaF_2$ | 0.4 to 0.6 |

10. A new composition of matter comprising the product of calcining under oxidizing conditions the following:

| | Molecular weights |
|---|---|
| $Sb_2O_3$ | 1 |
| $TiO_2$ | 1 to 4½ |
| $CaCO_3$ 50% to 90%<br>$Ca(OH)_2$ 50% to 10% | To yield CaO, more than 3 and less than 4½ |
| $CaF_2$ | ¼ to 1 |

11. A new composition of matter comprising the product of calcining under oxidizing conditions the following:

| | Molecular weights |
|---|---|
| $Sb_2O_3$ | 1 |
| $TiO_2$ | 1.3 to 3.0 |
| $CaCO_3$ 70% to 80%<br>$Ca(OH)_2$ 30% to 20% | To yield CaO, 3½ to 4 |
| $CaF_2$ | 0.4 to 0.6 |

CARL J. HARBERT.
CLARENCE A. SEABRIGHT.

CERTIFICATE OF CORRECTION.

Patent No. 2,306,357.   December 22, 1942.

CARL J. HARBERT, ET AL.

It is hereby certified that error appears in the printed specification of the above numbered patent requiring correction as follows: Page 2, first column, line 61, for "Molecular weight" read --Parts by weight--; and that the said Letters Patent should be read with this correction therein that the same may conform to the record of the case in the Patent Office.

Signed and sealed this 9th day of February, A. D. 1943.

(Seal)

Henry Van Arsdale,
Acting Commissioner of Patents.